(12) United States Patent
Milleville

(10) Patent No.: US 8,708,658 B2
(45) Date of Patent: Apr. 29, 2014

(54) LOCAL APPLICATION OF A PROTECTIVE COATING ON A SHROUDED GAS TURBINE ENGINE COMPONENT

(75) Inventor: Timothy A. Milleville, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 2038 days.

(21) Appl. No.: 11/786,501

(22) Filed: Apr. 12, 2007

(65) Prior Publication Data

US 2009/0074570 A1  Mar. 19, 2009

(51) Int. Cl.
F01D 5/28 (2006.01)

(52) U.S. Cl.
USPC ............................................. 416/241 R

(58) Field of Classification Search
USPC ............................................. 415/173.6
See application file for complete search history.

(56) References Cited

U.S. PATENT DOCUMENTS

| | | |
|---|---|---|
| 4,132,816 A | 1/1979 | Benden |
| 4,758,480 A | 7/1988 | Hecht |
| 5,197,852 A * | 3/1993 | Walker et al. ................. 415/200 |
| 5,209,645 A * | 5/1993 | Kojima et al. ............ 416/241 B |
| 5,252,026 A * | 10/1993 | Shepherd ....................... 415/115 |
| 5,783,318 A * | 7/1998 | Biondo et al. ................ 428/680 |
| 5,837,385 A | 11/1998 | Schaeffer |
| 6,042,951 A | 3/2000 | Kojima |
| 6,126,400 A * | 10/2000 | Nichols et al. ............ 416/241 R |
| 6,149,389 A | 11/2000 | Hennies |
| 6,254,756 B1 | 7/2001 | Maricocchi |
| 6,435,826 B1 | 8/2002 | Allen |
| 6,435,835 B1 * | 8/2002 | Allen et al. ............... 416/241 R |
| 6,695,587 B2 | 2/2004 | Wustman |
| 6,830,427 B2 * | 12/2004 | Lafarge et al. ................ 415/200 |
| 6,863,927 B2 * | 3/2005 | Langley et al. ............... 427/252 |
| 2009/0022583 A1 * | 1/2009 | Schrey et al. ............. 416/241 R |

FOREIGN PATENT DOCUMENTS

WO  WO 2006061431 A2 *  6/2006
WO  WO 2006111427 A1 *  10/2006

* cited by examiner

*Primary Examiner* — Richard Edgar
(74) *Attorney, Agent, or Firm* — Carlson, Gaskey & Olds, P.C.

(57) ABSTRACT

A gas turbine engine component includes a blade section having an inner end and an outer end, a shroud section at the outer end, and a platform at the inner end. A protective coating is disposed on the shroud, where the blade section is substantially free of the protective coating. The protective coating may also be disposed on the platform.

2 Claims, 3 Drawing Sheets

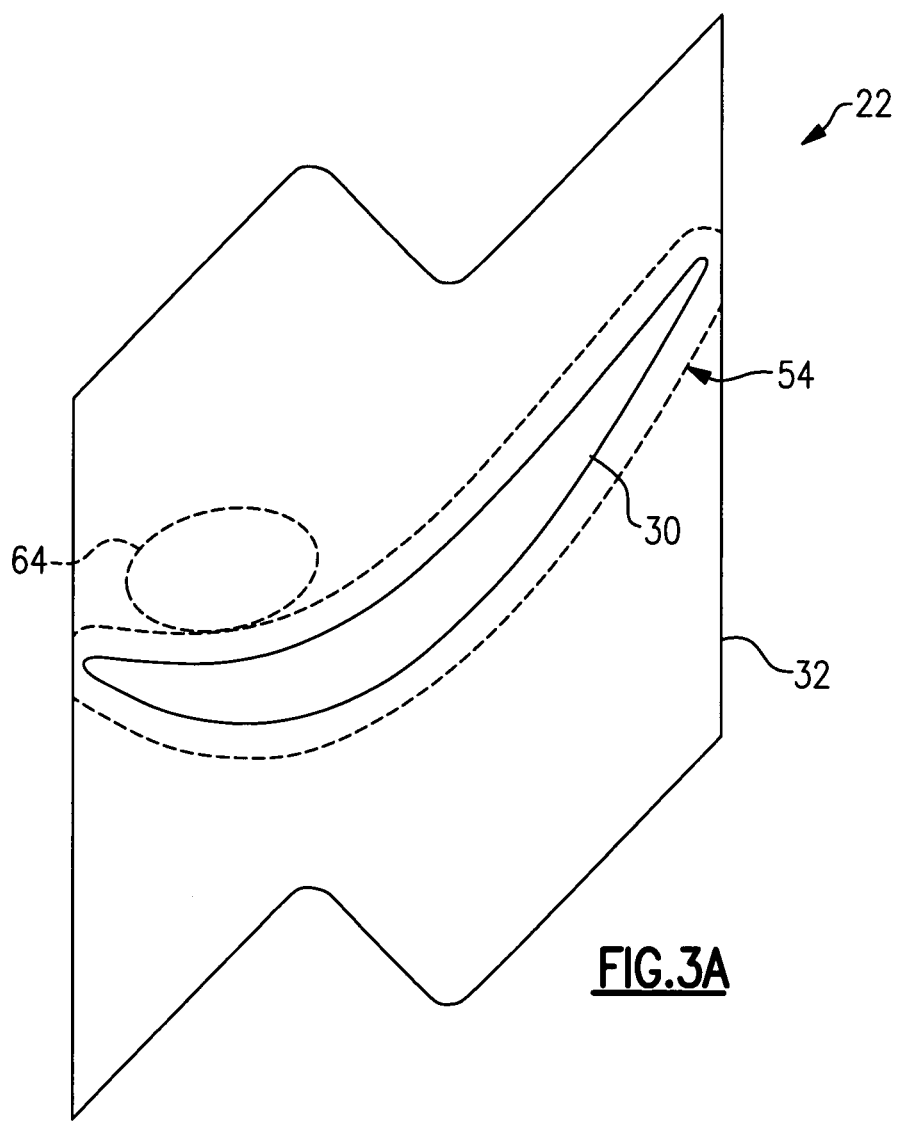
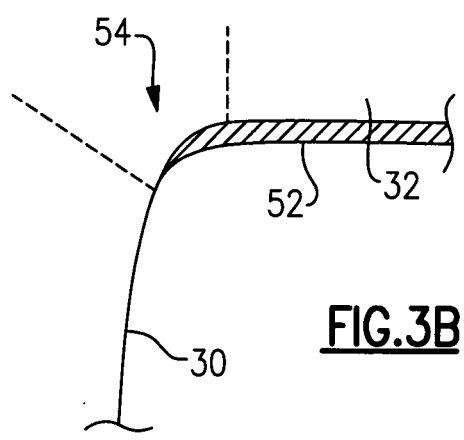

LOCAL APPLICATION OF A PROTECTIVE COATING ON A SHROUDED GAS TURBINE ENGINE COMPONENT

BACKGROUND OF THE INVENTION

This invention relates to protective coatings and, more particularly, to gas turbine engine components having a protective coating on selected portions thereof.

Components that are exposed to high temperatures, such as a turbine of a gas turbine engine, typically include a coating to protect the component from oxidation and corrosion. For example, turbine blades and vanes may include a protective coating on the blade airfoil portion that resists corrosion from hot gases flowing over the airfoil.

Although effective, such protective coatings may debit mechanical properties of the component. For example, protective coatings are often more brittle than superalloy materials typically used to make the component, and some coatings may interdiffuse with the superalloy to form localized brittle regions. Under fatigue conditions in a gas turbine engine, the coating and/or the localized brittle regions may cause fatigue cracking and thereby limit the useful life of the component. Additionally, the coating adds weight to the component without adding structural strength, which may require stronger or heavier components in order to achieve a desired durability.

Accordingly, there is a need for a protective coating that is disposed only on certain areas of a component to protect those areas from corrosion while maintaining mechanical properties of other uncoated areas. This invention addresses those needs while avoiding the shortcomings and drawbacks of the prior art.

SUMMARY OF THE INVENTION

An example gas turbine engine component includes a blade section having an inner end and an outer end, a shroud section at the outer end, and a platform section at the inner end. A protective coating is disposed on the shroud section and the blade section is substantially free of the protective coating.

In one example, the gas turbine engine component is a turbine blade of a turbine section of a gas turbine engine.

An example method of protecting the gas turbine engine component includes forming the protective coating on the shroud section, wherein the blade section is substantially free of the protective coating. For example, a precursor aluminide substance is painted onto the shroud section to form an aluminide material as the protective coating.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

FIG. 3A illustrates the turbine blade sectioned as shown in FIG. 2B.

FIG. 3B illustrates the turbine blade sectioned as shown in FIG. 2B.

DETAILED DESCRIPTION OF THE PREFERRED EMBODIMENT

Figure 1:
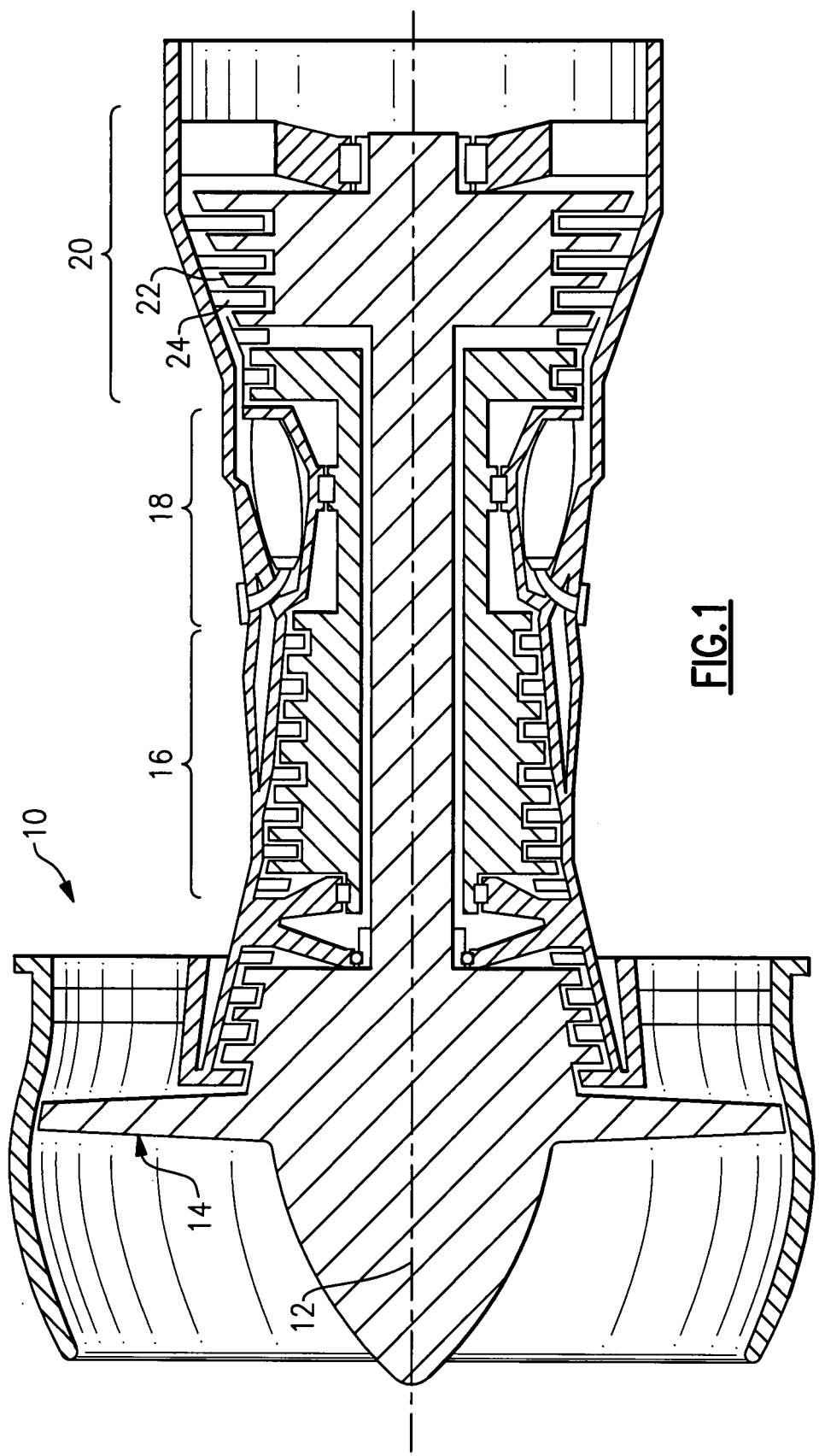
FIG. 1 illustrates an example gas turbine engine.

FIG. 1 illustrates selected portions of an example gas turbine engine 10, such as a gas turbine engine 10 used for propulsion. In this example, the gas turbine engine 10 is circumferentially disposed about an engine centerline 12. The engine 10 in this example includes a fan 14, a compressor section 16, a combustion section 18, and a turbine section 20 that includes turbine blades 22 and turbine vanes 24. As is known, air compressed in the compressor section 16 is mixed with fuel that is burned in the combustion section 18 to produce hot gasses that are expanded in the turbine section 20 to drive the fan 14. FIG. 1 is a somewhat schematic presentation for illustrative purposes only and is not a limitation on the disclosed examples. Additionally, there are various types of gas turbine engines, many of which could benefit from the examples disclosed herein, which are not limited to the design shown.

Figure 2A:
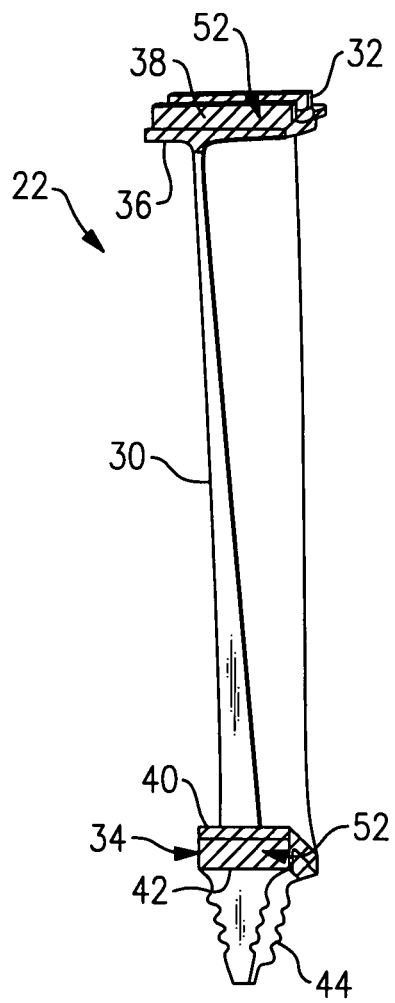
FIG. 2A illustrates an example turbine blade of the gas turbine engine.
Figure 2B:
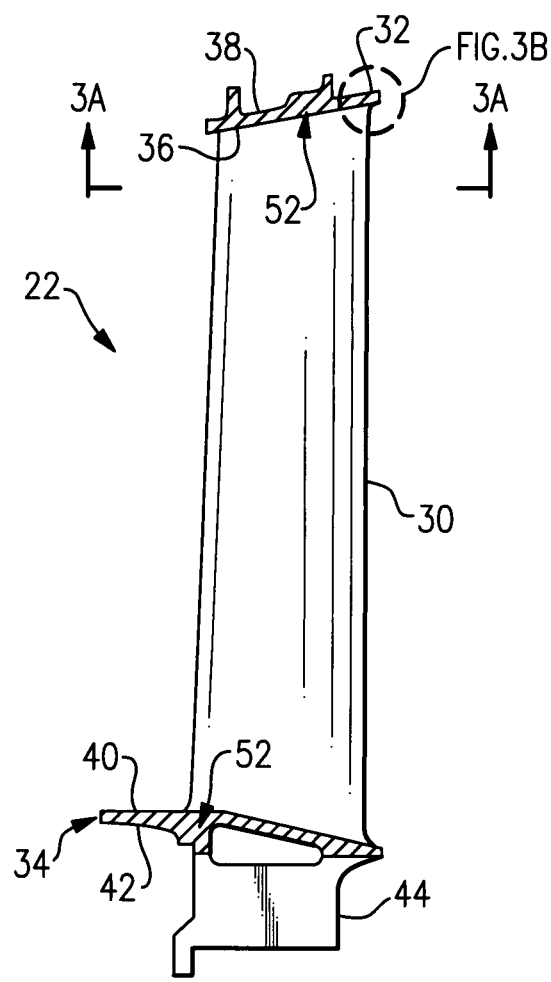
FIG. 2B illustrates another view of the example turbine blade.

FIGS. 2A and 2B illustrate an example of one of the turbine blades 22 shown in FIG. 1. Although this example is described with reference to the turbine blade 22, it should be understood that the example could also apply to the turbine vanes 24, or other components within the gas turbine engine 10.

In this example, the turbine blade 22 includes a blade section 30 (i.e. airfoil) having a shroud section 32 at a radially outer end relative to the centerline 12 and a platform section 34 at a radially inner end. The shroud section 32 includes an inner surface 36 adjacent the blade section 30 and an outer surface 38 opposite from the inner surface 36. That is, the inner surface 36 is directly exposed to a hot gas flow from the combustion section 18 while the outer surface 38 is not directly exposed to the hot gas flow.

The platform section 34 includes a topside 40 and an underside 42. The topside 40 is adjacent the blade section 30 and the underside 42 is located opposite from the topside 40. A root section 44 for attaching the turbine blade 22 to a rotor extends from the underside 42 in a direction away from the blade section 30.

In the disclosed example, certain portions (represented as shaded sections) of the turbine blade 22 may include an aluminide coating 52 that protects those portions from corrosion, such as sulphidization and oxidation, creating a sulphidization or oxidation portion. In the illustrated example, the shroud section 32 includes the aluminide coating 52 disposed thereon. In one example, all of the surfaces (i.e., the inner surface 36 and the outer surface 38) of the shroud section 32 include the aluminide coating 52. Optionally, the topside 40 and the underside 42 of the platform section 34 also include the aluminide coating 52. The blade section 30 and the root section 44 are substantially free of the aluminide coating 52.

Using the aluminide coating 52 only on certain portions of the turbine blade 22 provides numerous benefits. For example, the aluminide coating 52 may be disposed on selected portions that are known to be the most vulnerable to corrosion, such as the shroud section 32 and/or the platform section 34. Additionally, leaving certain other portions uncoated avoids debiting the mechanical properties of those areas. For example, the blade section 30 and root section 44 are generally under higher fatigue stresses than the shroud section 32 and platform section 34. Thus, by leaving the blade section 30 and root section 44 uncoated, the fatigue resistance of those sections is maintained. Additionally, using the aluminide coating 52 only on certain portions of the turbine blade 22 may reduce the weight of the turbine blade 22 compared to prior turbine blades that are entirely coated with a protective coating.

In one example, the aluminide coating 52 is MCrAlY material, where the M is nickel, cobalt, iron, or a combination thereof, Cr is chromium, Al is aluminum, and Y is yttrium. Given this description, one of ordinary skill in the art will recognize that other types of protective coatings may also be used.

FIG. 3A illustrates a portion of the turbine blade 22 according to a section shown in FIG. 2B, and FIG. 3B illustrates a portion of the turbine blade 22 according to another section shown in FIG. 2B. In the illustrated example, the blade section 30 transitions into the shroud section 32 at a fillet 54. That is, there is a transitioning radius of curvature between the shroud section 32 and the blade section 30. In this example, the aluminide coating 52 diminishes to zero across the fillet 54 from the shroud section 32 to the blade section 30. Thus, in this example, the aluminide coating 52 is disposed on the entire shroud section 32, while the blade section 30 is substantially free of the aluminide coating 52 and the fillet 54 is partially covered by the aluminide coating 52. Similarly, if the topside 40 of the platform section 34 includes the aluminide coating 52, a fillet between the platform section 34 and the blade section 30 includes a diminishing amount of aluminide coating 52 across the fillet.

In this example, the aluminide coating 52 is disposed on a repair section 64 of the shroud section 32. The repair section 64 may be a section that has been repaired and/or replaced due to corrosion of the shroud section 32. For example, the repair section 64 may have previously included pitting due to sulphidization corrosion during field use of the turbine blade 22 within engine 10. In this regard, the repair section 64 may be considered a sulphidization portion. Thus, in this example, the aluminide coating 52 is applied to the shroud section 32 as a step in a repair or refurbishment process of the turbine blade 22. However, it is to be understood that the disclosed examples may be also be applied to original turbine blades that have not been used in the field.

Figure 4:
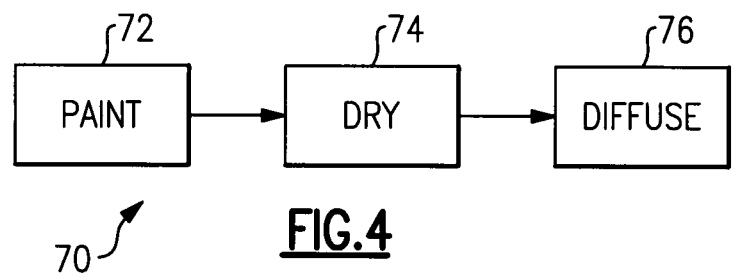
FIG. 4 illustrates an example method for forming a protective coating on selected portions of an engine component.

FIG. 4 illustrates one example method 70 for forming the aluminide coating 52. In this example, at step 72 a precursor aluminide substance, such as a paint, is painted onto certain selected areas of the turbine blade 22 (e.g., the shroud section 32 and/or the platform section 34 as described above). The precursor aluminide substance may contain a carrier, such as a solvent, that is removed or dried at step 74. Drying may be conducted at an elevated temperature, or alternatively at ambient conditions over a period of time. Once painted on, the precursor aluminide substance forms an aluminide intermediate coating on the areas of the turbine blade 22. The intermediate aluminide coating may include residual carrier or solvent. The intermediate aluminide coating and turbine blade 22 are then heated at a suitable temperature to at least partially diffuse the aluminide into the substrate superalloy material of the turbine blade 22 to form the aluminide coating 52. In some examples, the drying step 74 and the diffusing step 76 may be combined in a single process. Given this description, one of ordinary skill in the art will recognize alternative methods for forming the aluminide coating 52 on selected areas of the turbine blade 22. However, painting provides the benefit of being able to manually deposit the aluminide coating 52 on a selected area without having to mask off other areas of the turbine blade 22 as with some deposition processes.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine component comprising:
a blade section having an inner end and an outer end;
a shroud section at the outer end;
a platform section at the inner end; and
a protective coating disposed on the shroud section, wherein the blade section is substantially free of the protective coating, wherein the protective coating partially covers a fillet between the shroud section and the blade section, wherein the protective coating diminishes across the fillet.

2. A gas turbine engine component comprising:
a blade section having an inner end and an outer end;
a shroud section at the outer end;
a platform section at the inner end; and
a protective coating disposed on the shroud section, wherein the blade section is substantially free of the protective coating, wherein the protective coating partially covers a fillet between the topside of the platform section and the blade section, wherein the protective coating diminishes across the fillet.

* * * * *